UNITED STATES PATENT OFFICE.

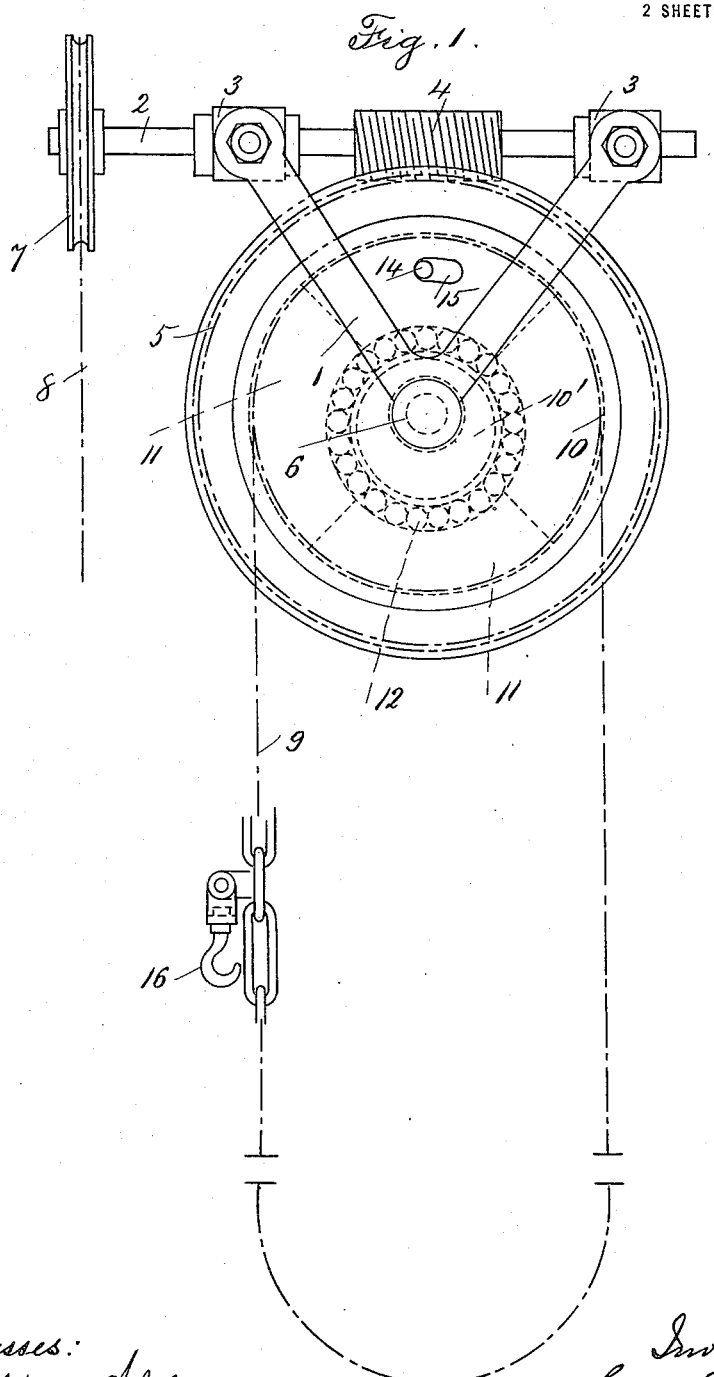

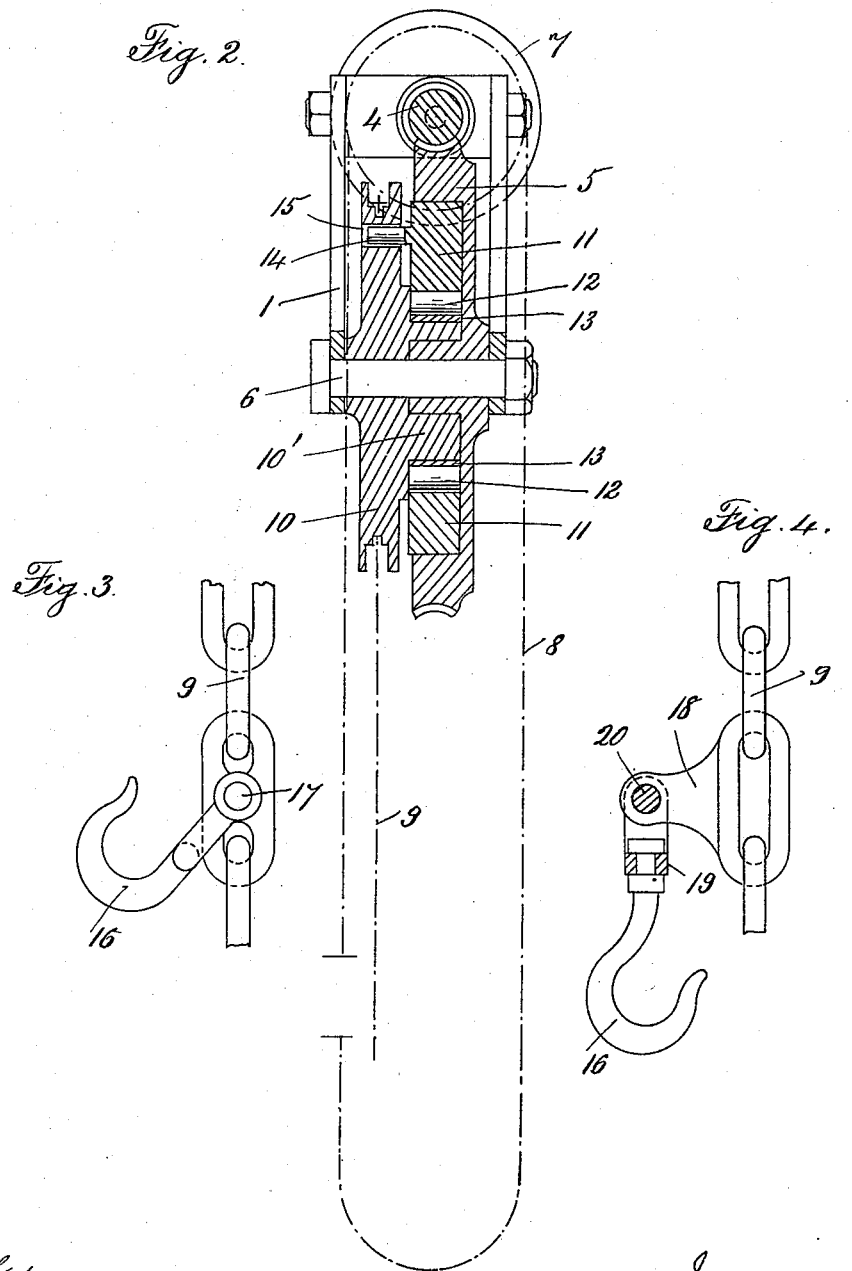

LOUIS TABULO, OF LONDON, ENGLAND.

PULLEY-BLOCK AND HOISTING AND LOWERING GEAR.

1,163,702.

Specification of Letters Patent.   Patented Dec. 14, 1915.

Application filed December 29, 1913.   Serial No. 809,238.

*To all whom it may concern:*

Be it known that I, LOUIS TABULO, a subject of the Emperor of Austria-Hungary, residing at 22 Valmar road, Denmark Hill, London, S. E., England, have invented new and useful Improvements in Pulley-Blocks and Hoisting and Lowering Gear, of which the following is a specification.

My invention chiefly relates to what is known as the worm and worm wheel pulley block, but may be used in other forms of hoisting and lowering apparatus, as hereinafter explained.

The object of my invention is to reduce the time and labor expended in hoisting and lowering a loadless hook.

With a view to demonstrating the importance of the object of my invention I will give an example of the great amount of time and labor expended in the case of an ordinary worm and worm wheel block and then contrast therewith the result which would under similar circumstances be obtained by the use of my improvements.

Let us assume that a worm and worm wheel block of ordinary construction is geared at 100 to 1, pull to lift. It consequently follows that to raise the loadless hook, say, 40 feet to fetch a load the endless chain of the worm wheel will have to be pulled 40×100 or 4,000 feet, and the same time and labor will have to be expended to lower the loadless hook, if after delivering a load 40 feet up it is required to lower the hook to raise the next load. In order to obviate this enormous loss of time and useless expenditure of energy I propose by my improvements to enable the operator to raise the loadless hook 40 feet by merely pulling 40 feet of chain, instead of 4,000 feet, and to lower the loadless hook by pulling a few feet of chain instead of 4,000 feet when the hook will of its own accord come down with a run by gravitation, or may be let gently down by allowing the chain to slip through one's hands.

The invention may be carried out in the following manner:—The load chain wheel of a worm and worm wheel pulley block instead of being rigidly attached to the worm wheel, as usual, is in my apparatus operatively connected to it by the intermediary of a free-wheel device, or a one-way clutch, permitting relative movement of the load chain wheel to the worm wheel in one direction but not in the other. The free-wheel device or one-way clutch may be of any suitable construction, such as that described and illustrated in the specification of my United States Letters Patent No. 1,014,728, but is preferably constructed in the manner described and illustrated in the specification of my application for a United States Patent, Serial No. 736,023. The load chain is endless and fits in the usual way the pockets of the load chain wheel, and the load hook is connected to the chain in any suitable manner, for instance in any of the ways hereinafter described.

The invention is illustrated by the accompanying drawings.

Of these drawings, Figure 1 is an elevation of a worm and worm wheel pulley block provided with my improvements. Fig. 2 is a vertical section of said block. Fig. 3 is a side elevation, drawn to an enlarged scale, illustrating one way in which the load hook may be connected to the load chain. and Fig. 4 is an elevation, partly in section, also drawn to an enlarged scale, showing an alternative construction which may be used in place of that illustrated by Fig. 3.

Referring now to these drawings, 1 is the frame of the block.

2 is a shaft rotatably mounted in bearings 3 in the frame 1.

4 is a worm fixed to the shaft 2.

5 is a worm wheel engaging with the worm 4 and rotatably mounted on the pin 6.

7 is a chain wheel secured to the extremity of the shaft 2. and 8 is an endless chain engaging with the chain wheel 7.

9 is the endless load chain and 10 is the load chain wheel.

According to the present invention the load chain wheel 10 instead of being rigidly attached to the worm wheel 5 or formed in one therewith, as is usually the case, is operatively connected to it through the medium of a free-wheel device or one-way clutch. The parts of this free-wheel device or one-way clutch are preferably constructed and arranged as shown in Figs. 1 and 2 and now to be described. The worm wheel 5 is made of box section and the load chain wheel 10 is formed with an eccentric hub 10' which projects into the hollow worm wheel 5. The space between the inner periphery of the hollow worm wheel 5 and the eccentric hub 10' of the load chain wheel 10 is provided with a number of segmental pieces 11, adapted to bear against the inner periphery of the hollow worm wheel 5, and also with a ring of rollers 12. These rollers 12 bear against the inner surfaces of the segmental pieces 11 and a ring 13 which loosely fits on the exterior of the eccentric hub 10' of the load chain wheel 10. A pin 14 is fixed to one of the segmental pieces 11 and projects into an eccentrically disposed slot 15 formed in the load chain wheel 10. The load hook 16 is connected in any suitable way to the load chain 9. For instance, as shown in Fig. 3, the load hook 16 may be secured to one of the links of said chain by means of a pin 17 passing through the link and the inner forked end of the hook 16, or, as shown in Figs. 1 and 4, one of the links of the load chain 9 may be provided with a lug 18 and the load hook 16 be pivoted to said lug by means of a shackle 19 and a bolt 20. If desired more than one load hook may be secured to the load chain.

The action of the above described parts is as follows:—Assume that the free-wheel connection between the load chain wheel 10 and the worm wheel 5 is such as to permit free movement of the load chain wheel 10 when the latter is turned from left to right in Fig. 1. If it is desired to rapidly raise a load suspended from the hook 16, or the hook itself, then a pull is exerted on the right hand side of the load chain 9. This will cause the slot 15 in the load chain wheel 10 to move over the pin 14 from left to right to a slight extent and the left hand of the slot 15 to bear against the pin 14, with the result that the frictional grip of the segmental pieces 11 on the inner periphery of the worm wheel 5 will be relaxed, and they will be carried around with the load chain wheel 10, freely rotating in the stationary worm wheel 5. As soon as the operator ceases to pull the load chain 9, the weight of the load and the hook 16, or the weight of the hook itself if said hook is unloaded, will cause the load chain wheel 10 to turn from right to left, and the segmental pieces, owing to the eccentricity of the hub 10' of the load chain wheel 10, will again bear against the inner periphery of the worm wheel 5, thus preventing the load from running down. It is clear then that if the load hook 16 be down a pull on the load chain 9 will raise it to the required height, foot pull for foot lift. On the other hand if the load hook 16 be up a pull of a few feet on the load chain 9 will raise the load hook 16 and cause it to pass around the load chain wheel 10 and owing to the action of the free-wheel and its own weight it will come down with a run on the other side if the load chain is not checked. When the hand chain 8 is pulled in either direction the worm wheel 5 and the load chain wheel 10 will work in the usual manner, that is to say will be driven by the worm 4 as if the two were rigidly connected.

It will be understood that when the load hook has passed over the top of the load chain wheel a light load can be suspended from said hook and be lowered in the same way as lowering is effected when a load chain is passed over an ordinary sheave, that is to say the descent of the load would be checked by hand.

I wish it to be understood that although I have described and illustrated my invention in its application to what is known as a worm and worm wheel pulley block my invention is equally applicable to other hoisting and lowering apparatus in which there is employed an endless load chain provided with one or more pivoted load hooks. In such applications of my invention the free wheel or one-way clutch may be located in any suitable position intermediate between the driving member and the load chain wheel.

Having now described my invention what I have invented and desire to secure by Letters Patent of the United States is as follows:—

1. In hoisting and lowering apparatus, the combination, of a supporting frame, a chain wheel rotatably mounted in said frame, an endless chain engaging with said chain wheel, a hook for the suspension of the load connected to the said chain, a driven member of the driving mechanism of the apparatus rotatably mounted in the frame of the apparatus, and a one-way clutch operatively connecting said chain wheel to said driven member.

2. In hoisting and lowering apparatus, the combination, of a frame, a chain wheel rotatably mounted in said frame, an endless chain engaging with said chain wheel, a hook for the suspension of the load connected to said chain, a worm wheel rotatably mounted in said frame at the side of said chain wheel, a worm engaging with said worm wheel and rotatably mounted in said frame, and a one-way clutch operatively connecting said chain wheel and said worm wheel.

3. In hoisting and lowering apparatus, the combination, of a worm, a worm wheel of box-section engaging with the said worm, and a chain wheel located at the side of said worm wheel and provided with an eccentric hub projecting into the said worm wheel, all the said parts being rotatably mounted in the said frame, an endless chain engaging with said chain wheel, a hook for the suspension of the load connected to said chain, and a one-way clutch operatively connecting said worm wheel with the said chain wheel, said clutch comprising segmental pieces interposed between the eccentric hub of the chain wheel and the inner periphery of the worm wheel, one of the segmental pieces having a laterally projecting pin which engages with a slot in the said chain wheel.

In testimony whereof I have signed my name to this specification in the presence of two subscribing witnesses.

LOUIS TABULO.

Witnesses:
 ARTHUR F. ENNIS,
 TRACY LAY.

Copies of this patent may be obtained for five cents each, by addressing the "Commissioner of Patents, Washington, D. C."